(12) United States Patent
Cheng et al.

(10) Patent No.: US 8,519,638 B2
(45) Date of Patent: Aug. 27, 2013

(54) ELECTRONIC BALLAST FOR A HIGH INTESITY DISCHARGE LAMP

(75) Inventors: Chun-An Cheng, Kaohsiung (TW); Chen-Wei Ku, Kaohsiung (TW)

(73) Assignee: I Shou University, Kaohsiung (TW)

( * ) Notice: Subject to any disclaimer, the term of this patent is extended or adjusted under 35 U.S.C. 154(b) by 206 days.

(21) Appl. No.: 13/229,221

(22) Filed: Sep. 9, 2011

(65) Prior Publication Data

US 2013/0063037 A1 Mar. 14, 2013

(51) Int. Cl.
*H05B 37/02* (2006.01)
(52) U.S. Cl.
USPC .................................. 315/291; 315/307
(58) Field of Classification Search
USPC .................. 315/200 R, 209 R, 224–226, 291, 315/307, 308, 312
See application file for complete search history.

(56) References Cited

U.S. PATENT DOCUMENTS 7,915,837 B2 * 3/2011 Shloush et al. ............... 315/291
8,143,804 B2 * 3/2012 Ger et al. ...................... 315/291

* cited by examiner

*Primary Examiner* — Jimmy Vu
(74) *Attorney, Agent, or Firm* — Steptoe & Johnson LLP

(57) ABSTRACT

An electronic ballast includes a power factor corrector having an input side for receiving an AC input voltage from a voltage source, and including first and second power switches connected in series across an output side. Each of the first and second power switches is operable based on a corresponding one of a first and second control signals in one of an ON-state and an OFF-state. The power factor corrector is operable to output at the output side a boosted DC voltage output corresponding to the AC input voltage in response to operation of the first and second power switches. A buck circuit receives the boosted DC voltage output from the power factor, and is operable based on the boosted DC voltage output to output an AC voltage output in the form of an AC square wave signal to a high intensity discharge lamp.

13 Claims, 16 Drawing Sheets

ELECTRONIC BALLAST FOR A HIGH INTESITY DISCHARGE LAMP

BACKGROUND OF THE INVENTION

1. Field of the Invention

The invention relates to an electronic ballast, and more particularly to an electronic ballast for a high intensity discharge (HID) lamp.

2. Description of the Related Art

High intensity discharge (HID) lamps have been widely used to replace incandescent lamps because HID lamps have high light-emitting efficiency, high color rendering index, and a long service life. However, the acoustic resonance phenomenon occurring in HID lamps may cause various problems, such as arc instability, color temperature variations, light output fluctuation, arc extinction, or in the worst case, cracked arc tubes.

To avoid the acoustic resonance, a low frequency square wave voltage having a frequency lower than 1 KHz is used to drive an HID lamp. FIG. 1 illustrates a conventional electronic ballast capable of generating a low frequency AC voltage for driving an HID lamp 200'. The conventional electronic ballast includes a filtering circuit 11, a bridge rectifier circuit 12, a boost converting circuit 13, a buck converting circuit 14, and a full-bridge converting circuit 15.

The filtering circuit 11 filters an AC input voltage from a voltage source 100' to eliminate high frequency electromagnetic interference.

The bridge rectifier circuit 12 is coupled to the filtering circuit 11. The bridge rectifier circuit 12 receives and rectifies the AC input voltage filtered by the filtering circuit 11, and outputs a rectified DC voltage.

The boost DC-to-DC converting circuit 13 is coupled to the bridge rectifier circuit 12 to receive the rectified DC voltage from the bridge rectifier circuit 12. The boost DC-to-DC converting circuit 13 has power factor correction function for boosting the rectified DC voltage to output a boosted DC voltage.

The buck DC-to-DC converting circuit 14 is coupled to the boost DC-to-DC converting circuit 13 to receive the boosted DC voltage from the boost DC-to-DC converting circuit 13. The buck DC-to-DC converting circuit 14 reduces the boosted DC voltage to output a buck DC voltage.

The full-bridge converting circuit 15 is coupled between the buck DC-to-DC converting circuit 14 and the HID lamp 200'. The full-bridge converting circuit 15 receives the buck DC voltage from the buck converting circuit 14, and converts the buck DC voltage into a low frequency AC voltage in the form of an AC square wave signal. The low frequency AC voltage is output to the HID lamp as a driving voltage.

In such a configuration, the conventional electronic ballast has a relatively complicated circuit construction that consists of a large number of components, thereby resulting in a relatively high cost. In addition, the conventional electronic ballast generates the driving voltage for the HID lamp 200' through multi-stage conversion, thereby resulting in reduced power conversion efficiency.

SUMMARY OF THE INVENTION

Therefore, an object of the present invention is to provide an electronic ballast for an HID lamp that can overcome the aforesaid drawbacks of the prior art.

According to the present invention, an electronic ballast for an HID lamp comprises:

a power factor corrector having an input side adapted to be coupled across a voltage source for receiving an AC input voltage from the voltage source, and an output side, the power factor corrector including first and second power switches connected in series across the output side, each of the first and second power switches having a control input end for receiving a corresponding one of first and second control signals, and operable based on the corresponding one of the first and second control signals in one of an ON-state and an OFF-state, the power factor corrector being operable to output at the output side a boosted DC voltage output corresponding to the AC input voltage in response to operation of the first and second power switches; and a buck circuit having an input side coupled to the output side of the power factor corrector for receiving the boosted DC voltage output, and an output side adapted to be coupled across the HID lamp, the buck circuit being operable based on the boosted DC voltage output to output an AC voltage output in the form of an AC square wave signal to the HID lamp.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
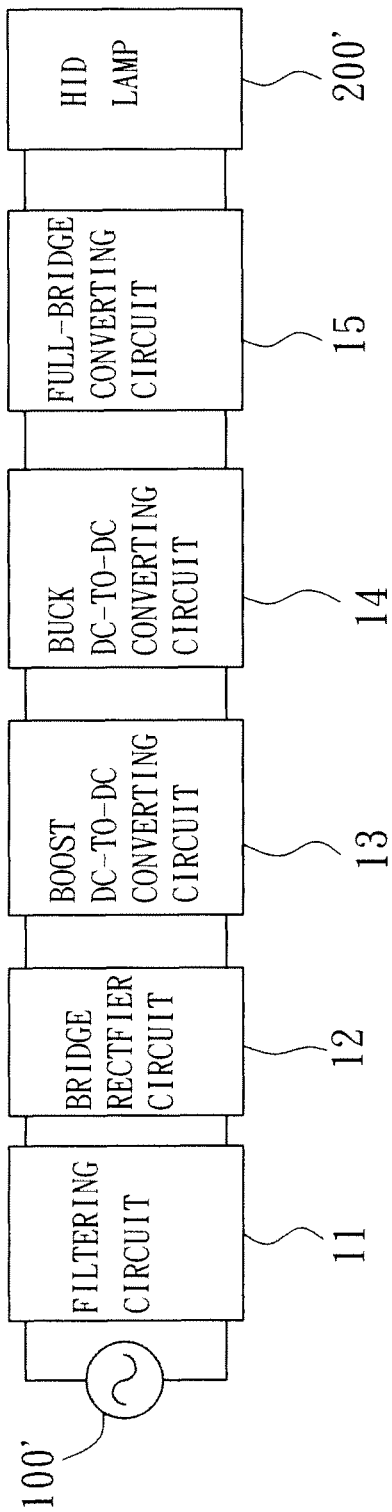
FIG. 1 is a schematic circuit block diagram of a conventional electronic ballast for an HID lamp.

Before the present invention is described in greater detail, it should be noted that like elements are denoted by the same reference numerals throughout the disclosure.

Figure 2:
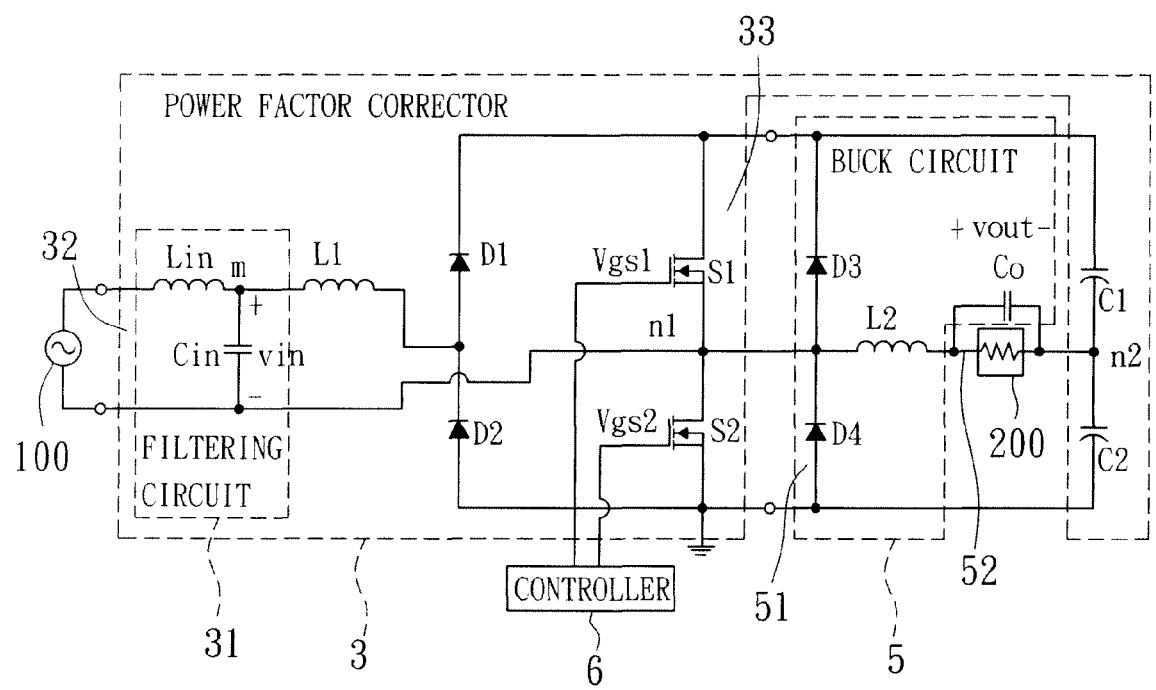
FIG. 2 is a schematic electrical circuit diagram illustrating the first preferred embodiment of an electronic ballast for an HID lamp according to the present invention.

Referring to FIG. 2, the first preferred embodiment of an electronic ballast for an HID lamp 200 according to the present invention is shown to include a power factor corrector 3, a buck circuit 5, and a controller 6.

The power factor corrector 3 has an input side 32 and an output side 33. The input side 32 is adapted to be coupled across a voltage source 100 for receiving an AC input voltage from the voltage source 100. In this embodiment, the power factor corrector 3 includes a filtering circuit 31, a boost inductor (L1), first and second rectifying diodes (D1, D2), first and second power switches (S1, S2), and first and second capacitors (C1, C2). The filtering circuit 31 filters the AC input voltage from the voltage source 100 to eliminate high frequency electromagnetic interference, and generates a filtered AC voltage (vin). The filtering circuit 31 includes a filtering inductor (Lin) and a filtering capacitor (Cin) connected electrically in series across the input side 32 of the power factor corrector 3. The filtered AC voltage (vin) is a voltage across the filtering capacitor (Cin). The boost inductor (L1) is coupled to a common node (m) between the filtering inductor (Lin) and the filtering capacitor (Cin). The first and second rectifying diodes (D1, D2) are coupled in series across the output side 33 of the power factor corrector 3. The first rectifying diode (D1) has an anode coupled to the boost inductor (L1), and a cathode. The second rectifying diode (D2) has an anode, and a cathode coupled to the boost inductor (L1) and the anode of the first rectifying diode (D1). The first and second power switches (S1, S2) are connected in series across the output side 33 of the power factor corrector 3. The first power switch (S1) is coupled to the cathode of the first rectifying diode (D1). The second power switch (S2) is coupled to the anode of the second rectifying diode (D2). Each of the first and second power switches (S1, S2) has a control input end for receiving a corresponding one of first and second control signals (Vgs1, Vgs2), and is operable based on the corresponding one of the first and second control signals (Vgs1, Vgs2) in one of an ON-state and an OFF-state. A common node (n1) between the first and second power switches (S1, S2) is coupled to the filtering capacitor (Cin). The first and second capacitors (C1, C2) are coupled in series across the output side 33 of the power factor corrector 3. In this embodiment, the power factor corrector 3 is operable to output, at the output side 33, a boosted DC voltage output corresponding to the AC input voltage in response to operation of the first and second power switches (S1, S2).

The controller 6 is coupled to the control input ends of the first and second power switches (S1, S2). In this embodiment, referring to FIGS. 3a and 3b, the controller 6 is configured to output the first control signal (Vgs1) to the control input end of the first power switch (S1) during a first period (T1), and to output the second control signal (Vgs2) to the control input end of the second power switch (S2) during a second period (T2). The first and second control signals (Vgs1, Vgs2) are similar to each other such that the first and second power switches (S1, S2) have the same duty cycle. The first and second periods (T1, T2) constitute a control cycle (T) of the controller 6.

The buck circuit 5 has an input side 51 coupled to the output side 33 of the power factor corrector 3 for receiving the boosted DC voltage output, and an output side 52 adapted to be coupled across the HID lamp 200. The buck circuit 5 is operable based on the boosted DC voltage output to output an AC voltage output (vout) in the form of an AC square wave signal to the HID lamp 200 (see FIG. 3g). A cycle of the AC voltage output (vout) is identical to the control period (T) of the controller 6. The buck circuit 5 includes third and fourth diodes (D3, D4), a buck inductor (L2), and an output capacitor (Co). The third and fourth diodes (D3, D4) are connected in series across the input side (51) of the buck circuit 5. The third diode (D3) has an anode coupled to a cathode of the fourth diode (D4), and to the common node (n1) between the first and second power switches (S1, S2). The third diode (D3) is coupled in parallel to the first power switch (S1) of the power factor corrector 3. The buck inductor (L2) and the output capacitor (Co) are coupled in series between the common node (n1) between the first and second power switches (S1, S2), and a common node (n2) between the first and second capacitors (C1, C2) of the power factor corrector 3. The output capacitor (Co) is coupled to the common node (n2) between the first and second capacitors (C1, C2), and is adapted to be coupled across the HID lamp 200 such that the AC voltage output (vout) is a voltage across the output capacitor (Co).

Figure 3:
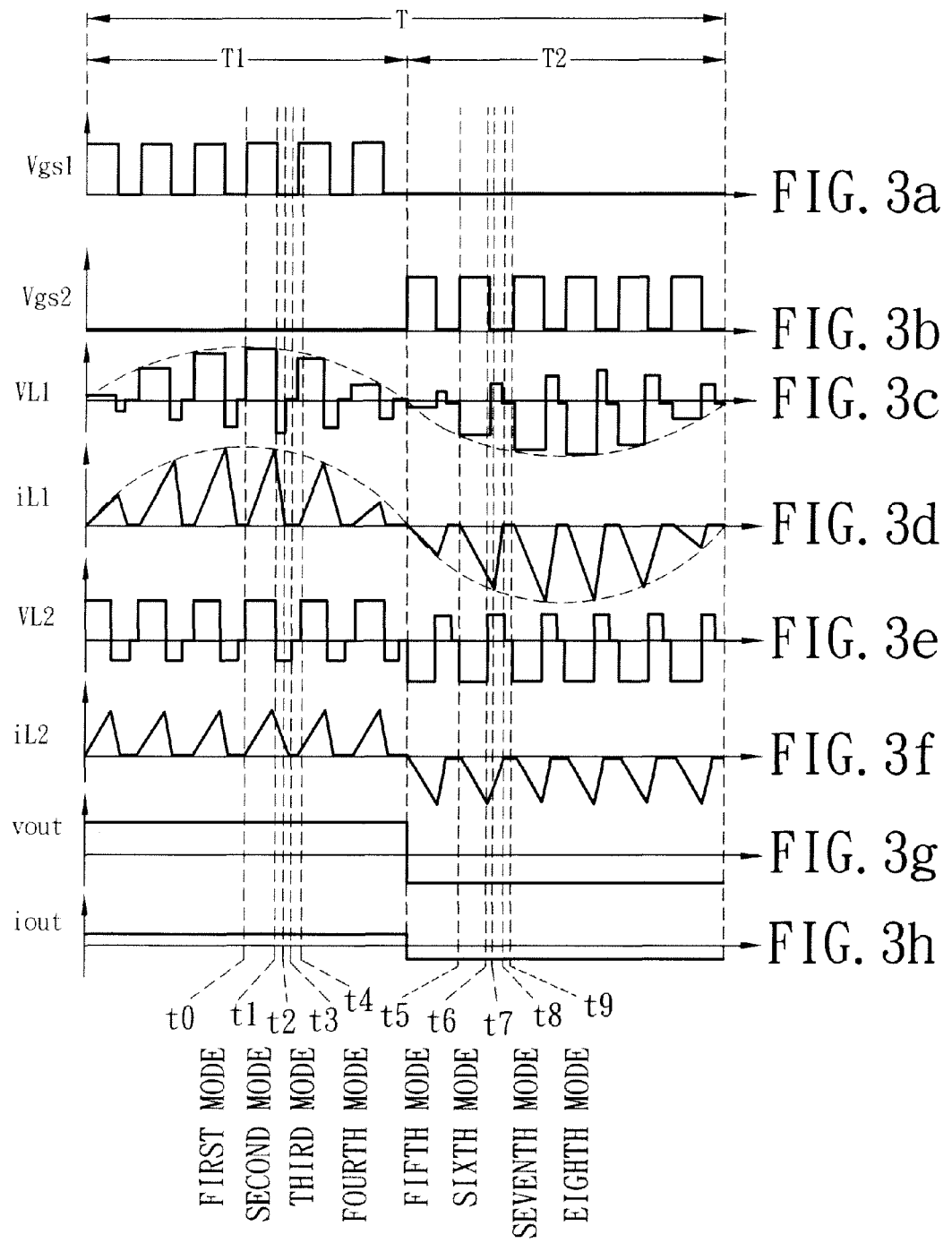
FIGS. 3a and 3b illustrate waveforms of first and second control signals (Vgs1, Vgs2) generated by a controller of the first preferred embodiment, respectively.
FIGS. 3c and 3d illustrate waveforms of a voltage (VL1) across a boost inductor of the first preferred embodiment and a current (iL1) flowing through the boost inductor, respectively.
FIGS. 3e and 3f illustrate waveforms of a voltage (VL2) across a buck inductor of the first preferred embodiment and a current (iL2) flowing through the buck inductor, respectively.
FIGS. 3g and 3h illustrate waveforms of an AC voltage output (vout) across the HID lamp and a current (iout) flowing through the HID lamp, respectively.

The electronic ballast of the first preferred embodiment is operable among first to eighth modes during the control cycle (T) of the controller 6, wherein the first to fourth modes occur in a positive half-cycle of the AC input voltage, i.e., the first period (T1), and the fifth to eighth modes occur in a negative half-cycle of the AC input voltage, i.e., the second period (T2), as shown in FIGS. 3a and 3b. FIGS. 3c and 3d illustrate waveforms of a voltage (VL1) across the boost inductor (L1) and a current (iL1) flowing through the boost inductor (L1), respectively. FIGS. 3e and 3f illustrate waveforms of a voltage (VL2) across the buck inductor (L2) and a current (iL2) flowing through the buck inductor (L2), respectively. FIGS. 3g and 3h illustrate waveforms of the AC voltage output (vout) and a current (iout) flowing through the HID lamp, respectively.

Figure 4:
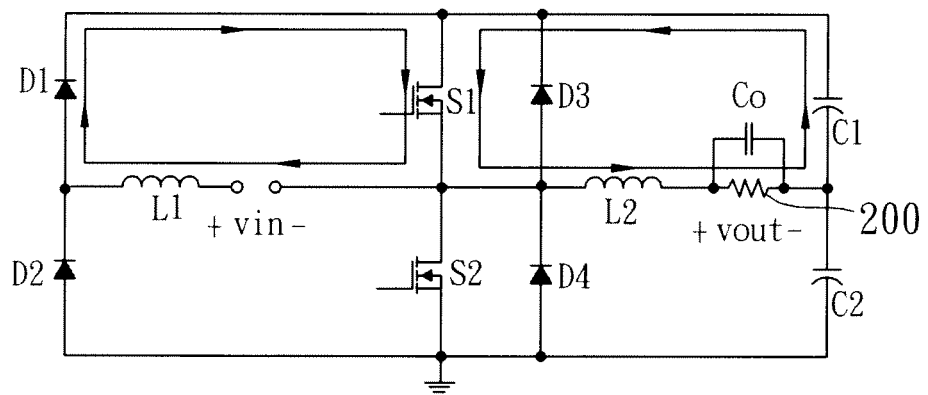
FIG. 4 is a schematic equivalent electrical circuit diagram of the first preferred embodiment when operated in a first mode.

Referring further to FIGS. 3a to 3h, and 4, the electronic ballast is operated in the first mode during a period from $t_0$ to $t_1$. In FIG. 4, the first power switch (S1) is in the ON-state while the second power switch (S2) is in the OFF-state. In this case, the boost inductor (L1) is charged with the AC voltage (vin) through the first diode (D1) and the first power switch (S1) such that the current (iL1) flowing through the boost capacitor (L1) increases. At the same time, the buck inductor (L2) and the output capacitor (Co) are charged with a voltage across the first capacitor (C1) through the first power switch (S1) such that the current (iL2) flowing through the buck inductor (L2) increases.

Figure 5:
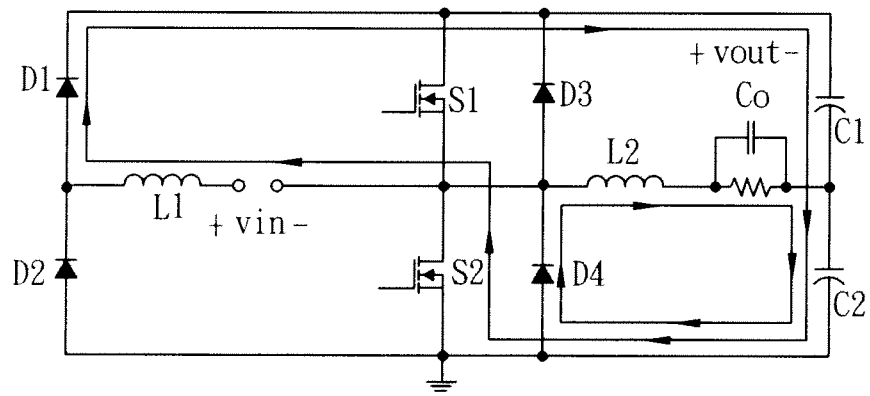
FIG. 5 is a schematic equivalent electrical circuit diagram of the first preferred embodiment when operated in a second mode.

Referring further to FIGS. 3a to 3h, and 5, the electronic ballast is operated in the second mode during a period from $t_1$ to $t_2$. In FIG. 5, the first and second power switches (S1, S2) are in the OFF-state. In this case, the current (iL1) flowing through the boost inductor (L1) cannot reverse at once but decreases. At the same time, the first and second capacitors (C1, C2) are charged with the voltage (VL1) across the boost inductor (L1) and the AC voltage (vin) through the fourth diode (D4) and the first rectifying diode (D1). In addition, the output capacitor (Co) and the second capacitor (C2) are charged with the voltage (VL2) across the buck inductor (L2) through the fourth diode (D4) until the current (iL1) flowing through the boost inductor (L1) decreases to zero.

Figure 6:
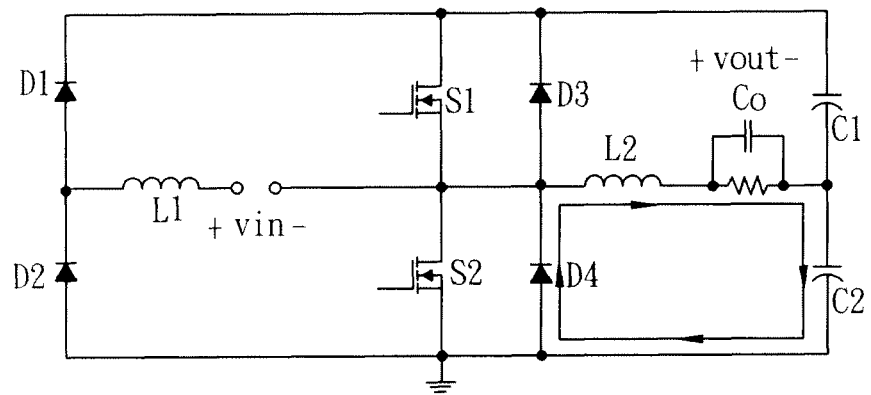
FIG. 6 is a schematic equivalent electrical circuit diagram of the first preferred embodiment when operated in a third mode.

Referring further to FIGS. 3a to 3h, and 6, the electronic ballast is operated in the third mode during a period from $t_2$ to $t_3$. In FIG. 6, the first and second power switches (S1, S2) are in the OFF-state. In this case, the output capacitor (Co) and the second capacitor (C2) are continuously charged with the voltage (VL2) across the buck inductor (L2) through the fourth diode (D4) until the current (iL2) flowing through the buck inductor (L2) decreases to zero.

Figure 7:
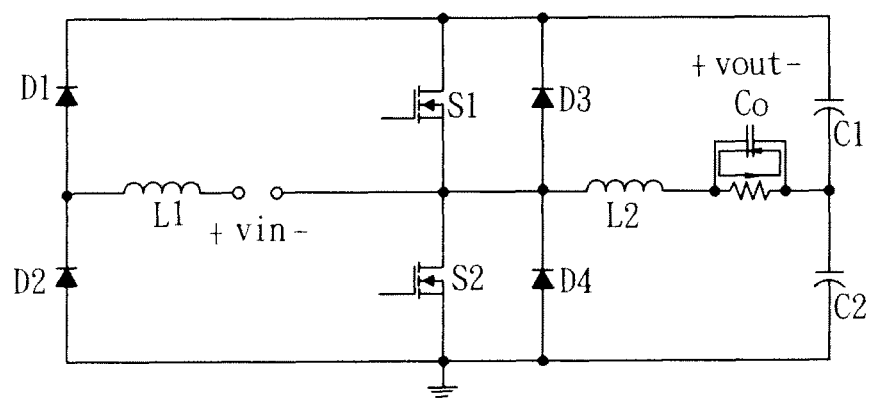
FIG. 7 is a schematic equivalent electrical circuit diagram of the first preferred embodiment when operated in a fourth mode.

Referring further to FIGS. 3a to 3h, and 7, the electronic ballast is operated in the fourth mode during a period from $t_3$ to $t_4$. In FIG. 7, the first and second power switches (S1, S2) are in the OFF-state. In this case, since the currents (iL1, iL2) flowing through the boost inductor (L1) and the buck inductor (L2) are zero, the output capacitor (Co) releases energy to supply power to the HID lamp 200.

Figure 8:
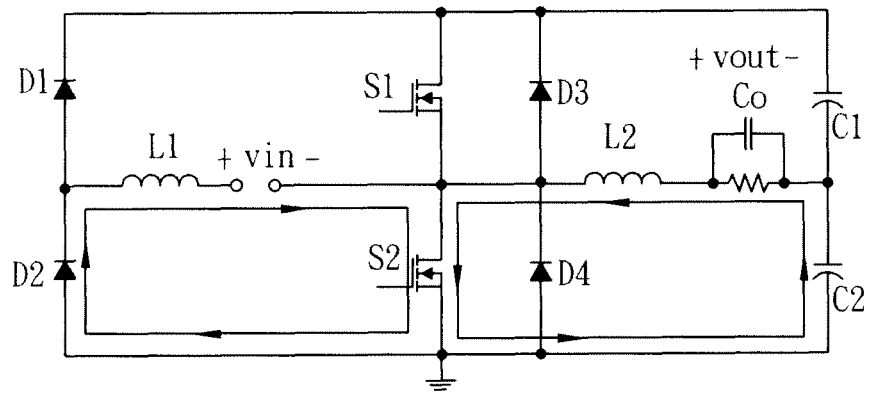
FIG. 8 is a schematic equivalent electrical circuit diagram of the first preferred embodiment when operated in a fifth mode.

Referring further to FIGS. 3a to 3h, and 8, the electronic ballast is operated in the fifth mode during a period from $t_5$ to $t_6$. In FIG. 8, the first power switch (S1) is in the OFF-state while the second power switch (S2) is in the ON-state. In this case, the boost inductor (L1) is charged in revere with the AC voltage (vin) through the second diode (D2) and the second power switch (S2) such that the current (iL1) flowing through the boost capacitor (L1) decreases. At the same time, the buck inductor (L2) and the output capacitor (Co) are charged in reverse with the voltage across the second capacitor (C2) through the second power switch (S2) such that the current (iL2) flowing through the buck inductor (L2) decreases.

Figure 9:
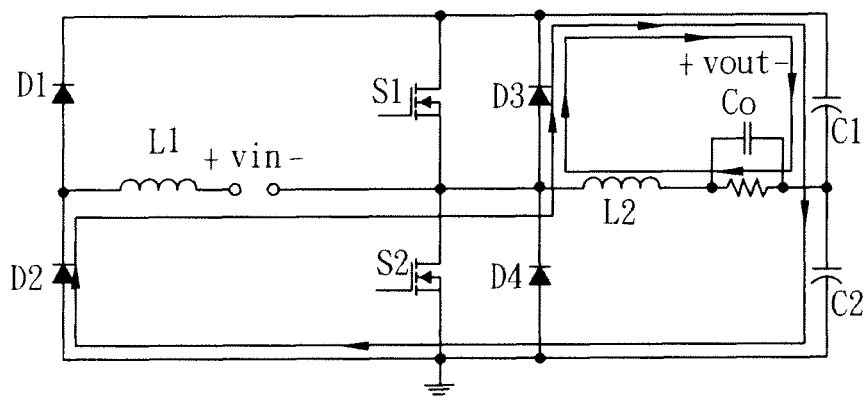
FIG. 9 is a schematic equivalent electrical circuit diagram of the first preferred embodiment when operated in a sixth mode.

Referring further to FIGS. 3a to 3h, and 9, the electronic ballast is operated in the sixth mode during a period from $t_6$ to $t_7$. In FIG. 9, the first and second power switches (S1, S2) are in the OFF-state. In this case, the current (iL1) flowing through the boost inductor (L1) cannot reverse at once but increases. At the same time, the first and second capacitors (C1, C2) are charged with the voltage (VL1) across the boost inductor (L1) and the AC voltage (vin) through the third diode (D2) and the second rectifying diode (D2). In addition, the output capacitor (Co) and the second capacitor (C2) are reversely charged with the voltage (VL2) across the buck inductor (L2) through the third diode (D4) until the current (iL1) flowing through the boost inductor (L1) increases to zero.

Figure 10:
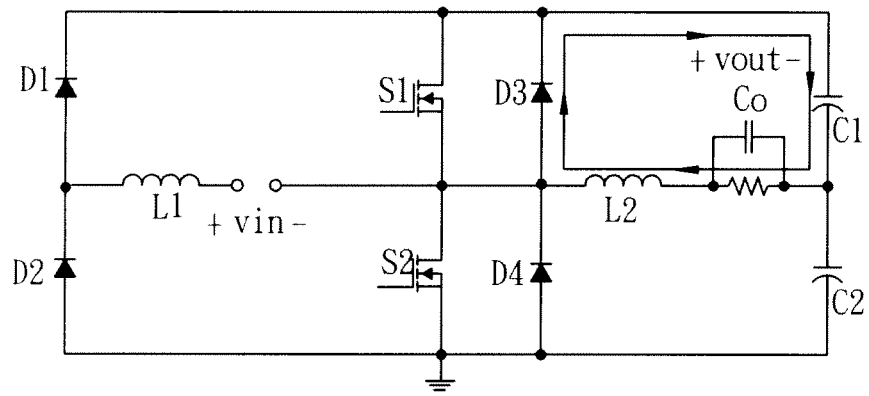
FIG. 10 is a schematic equivalent electrical circuit diagram of the first preferred embodiment when operated in a seventh mode.

Referring further to FIGS. 3a to 3h, and 10, the electronic ballast is operated in the seventh mode during a period from $t_7$ to $t_8$. In FIG. 10, the first and second power switches (S1, S2) are in the OFF-state. In this case, the output capacitor (Co) and the second capacitor (C2) are charged continuously in reverse with the voltage (VL2) across the buck inductor (L2) through the third diode (D3) until the current (iL2) flowing through the buck inductor (L2) increases to zero.

Figure 11:
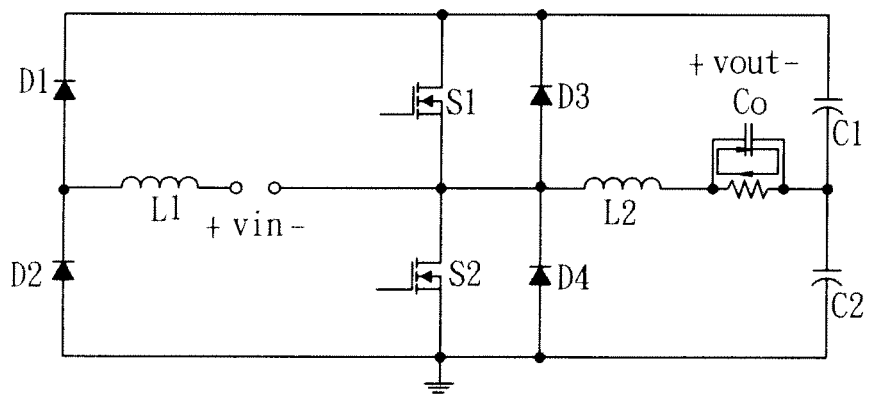
FIG. 11 is a schematic equivalent electrical circuit diagram of the first preferred embodiment when operated in an eighth mode.

Referring further to FIGS. 3a to 3h, and 11, the electronic ballast is operated in the eighth mode during a period from $t_8$ to $t_9$. In FIG. 11, the first and second power switches (S1, S2) are in the OFF-state. In this case, since the currents (iL1, iL2) flowing through the boost inductor (L1) and the buck inductor (L2) are zero, the output capacitor (Co) releases energy to supply power to the HID lamp 200.

Figure 12:
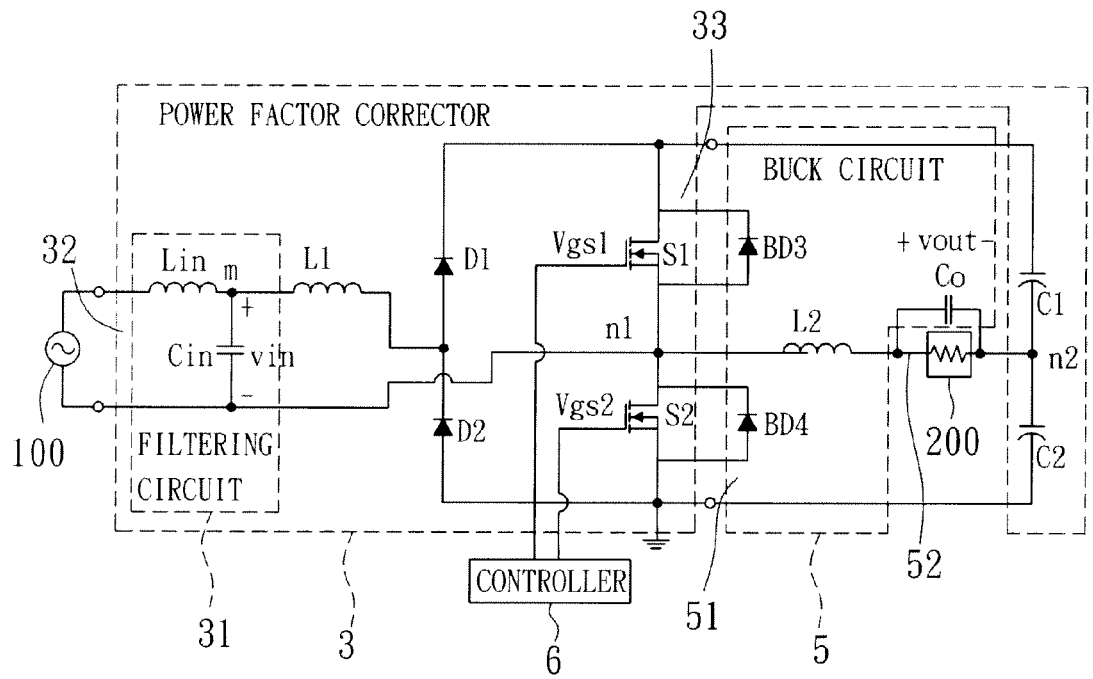
FIG. 12 is a schematic electrical circuit diagram illustrating a variation of the first preferred embodiment.

FIG. 12 illustrates a variation of the first preferred embodiment, wherein each of the first and second power switches (S1, S2) is a power transistor that has an intrinsic diode (BD3, BD4). The intrinsic diodes (BD3, BD4) are substituted for the third and fourth diodes (D3, D4) of the buck circuit 5 in the first preferred embodiment.

Figure 13:
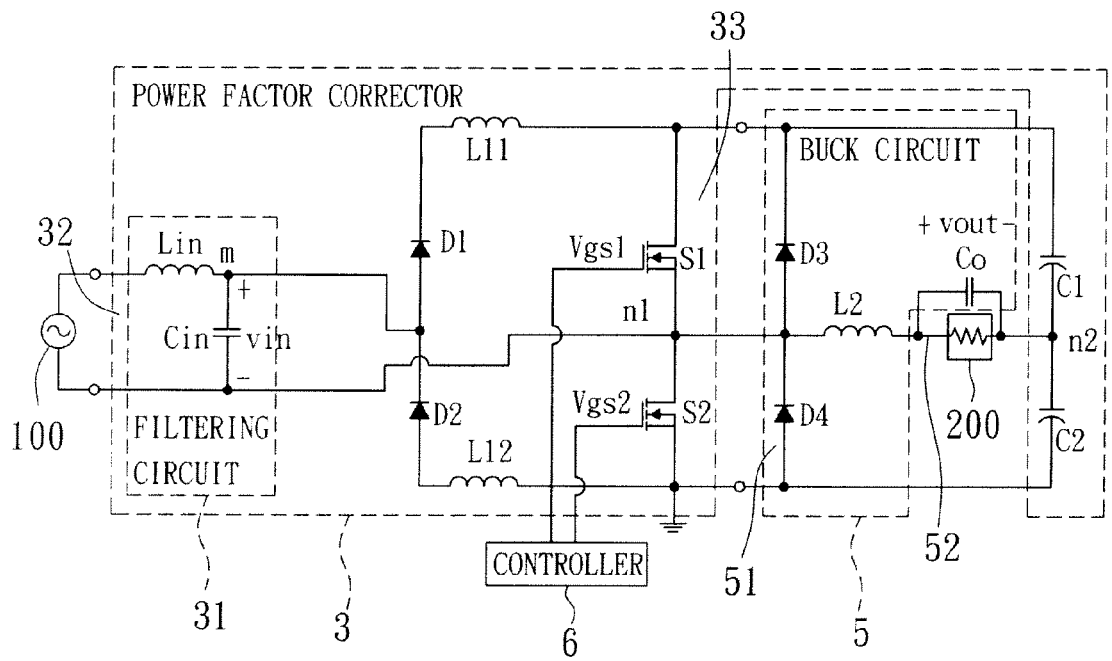
FIG. 13 is a schematic electrical circuit diagram illustrating the second preferred embodiment of an electronic ballast for an HID lamp according to the present invention.

FIG. 13 illustrates the second preferred embodiment of an electronic ballast for an HID lamp 200 according to this invention, which is a modification of the first preferred embodiment. Unlike the previous embodiment, the power factor corrector 3 includes first and second boost inductors (L11, L12) that are substituted for the boost inductor (L1) in the first preferred embodiment. The first boost inductor (L11) is coupled between the cathode of the first rectifying diode (D1) and the first power switch (S1). The second boost inductor (L12) is coupled between the anode of the second rectifying diode (D2).

Figure 14:
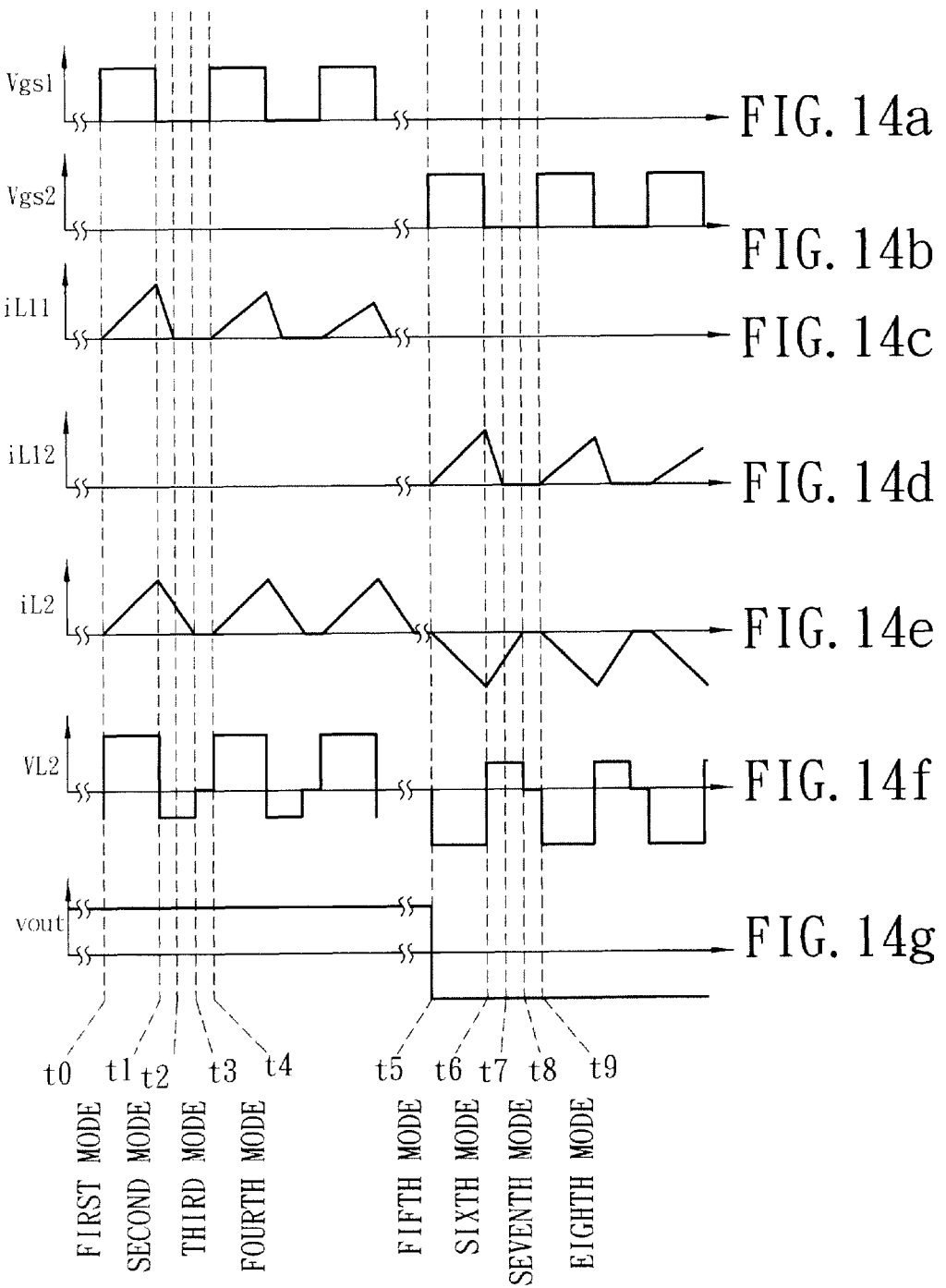
FIGS. 14a and 14b illustrate waveforms of first and second control signals (Vgs1, Vgs2) generated by a controller of the second preferred embodiment, respectively.
FIGS. 14c, 14d and 14e illustrate waveforms of currents (iL11,iL22,iL2) across a first boost inductor, a second boost inductor and a buck inductor of the second preferred embodiment, respectively.
FIGS. 14f and 14g illustrate waveforms of a voltage (VL2) across the buck inductor and an AC voltage output (vout) across the HID lamp, respectively.
Figure 15:
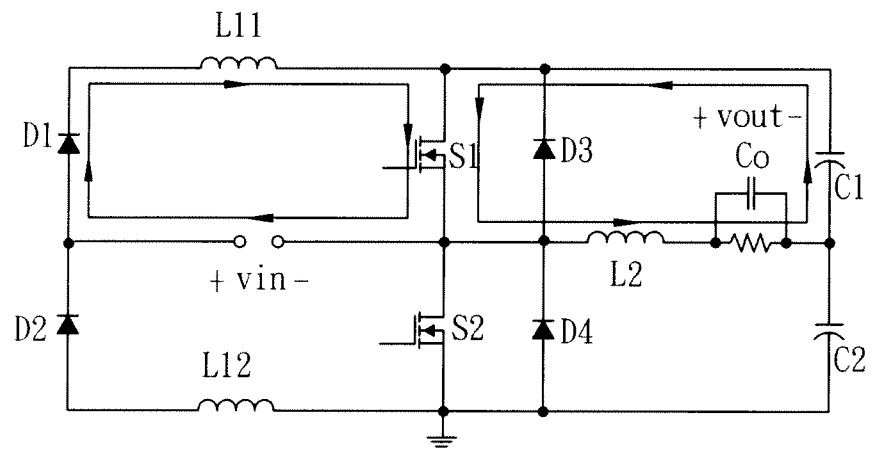
FIG. 15 is a schematic equivalent electrical circuit diagram of the second preferred embodiment when operated in a first mode.
Figure 16:
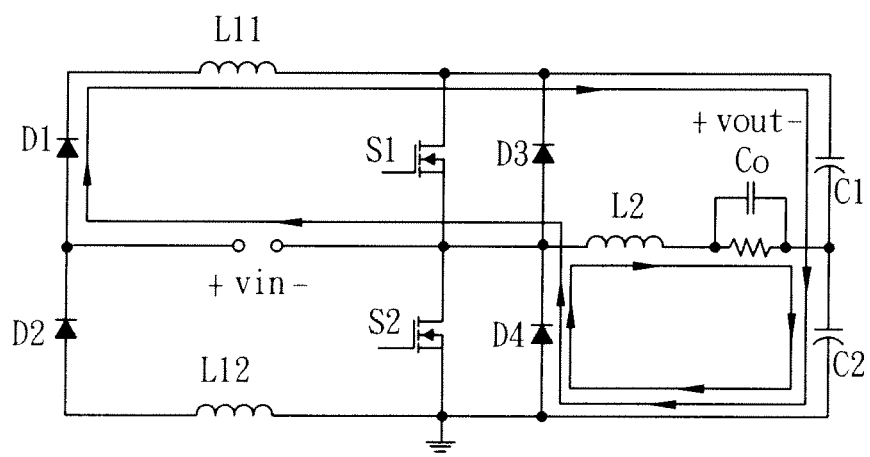
FIG. 16 is a schematic equivalent electrical circuit diagram of the second preferred embodiment when operated in a second mode.
Figure 17:
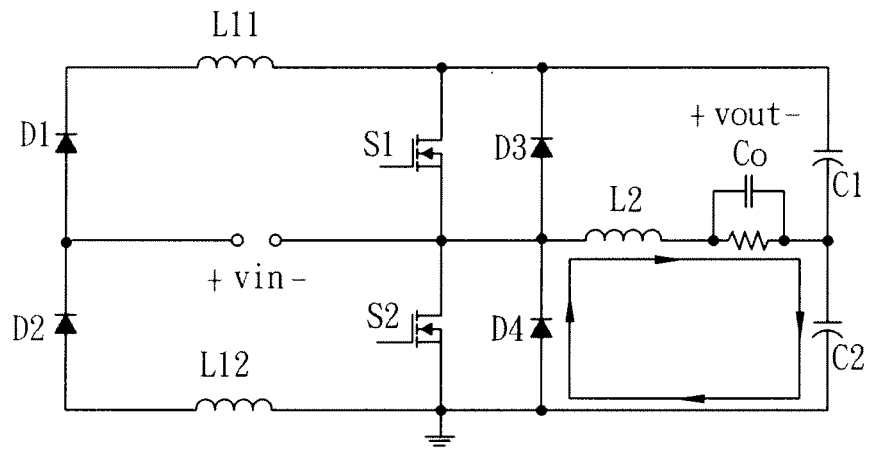
FIG. 17 is a schematic equivalent electrical circuit diagram of the second preferred embodiment when operated in a third mode.
Figure 18:
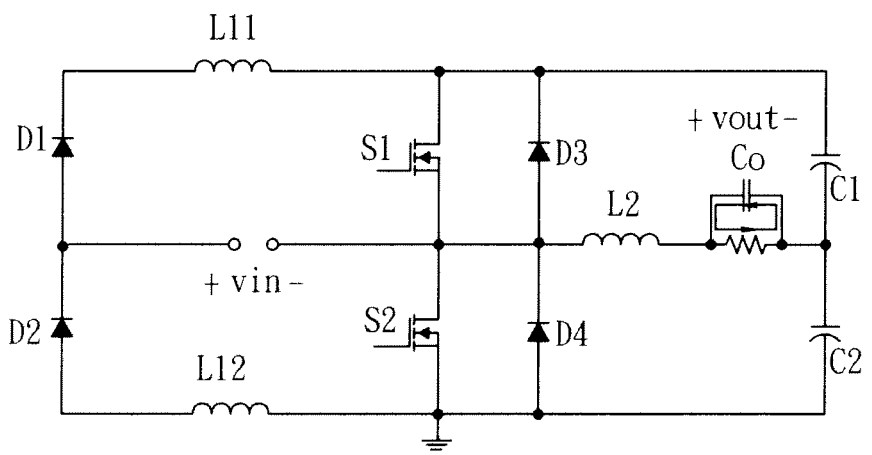
FIG. 18 is a schematic equivalent electrical circuit diagram of the second preferred embodiment when operated in a fourth mode.
Figure 19:
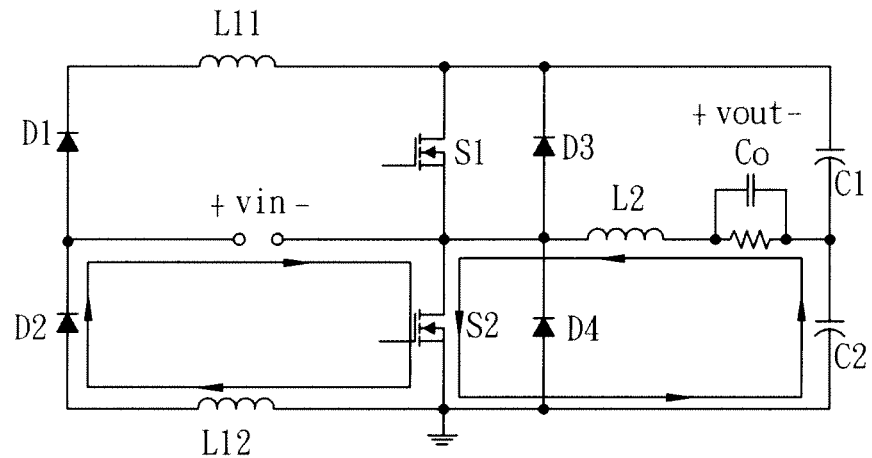
FIG. 19 is a schematic equivalent electrical circuit diagram of the second preferred embodiment when operated in a fifth mode.
Figure 20:
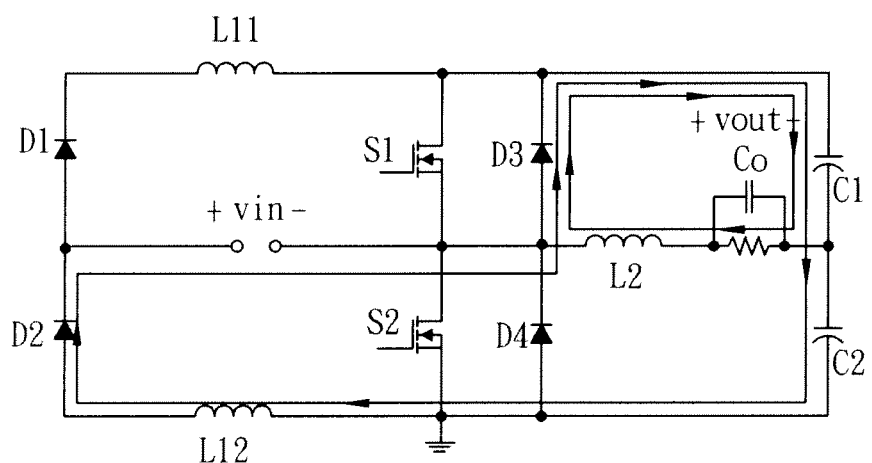
FIG. 20 is a schematic equivalent electrical circuit diagram of the second preferred embodiment when operated in a sixth mode.
Figure 21:
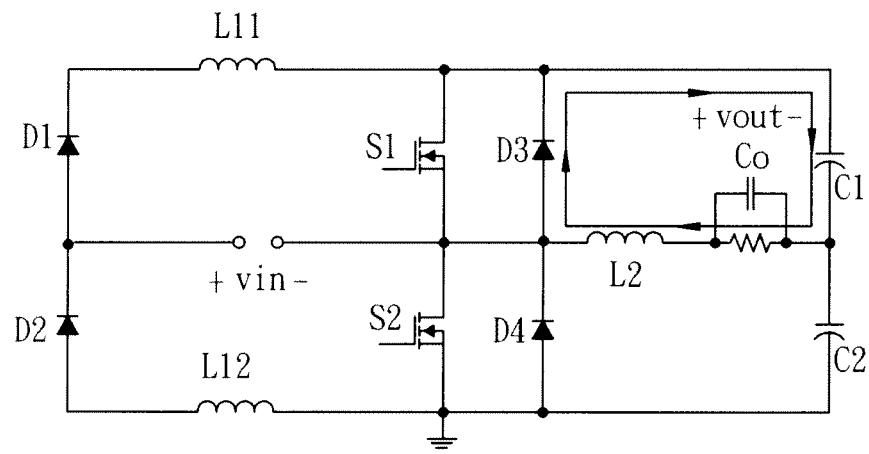
FIG. 21 is a schematic equivalent electrical circuit diagram of the second preferred embodiment when operated in a seventh mode.
Figure 22:
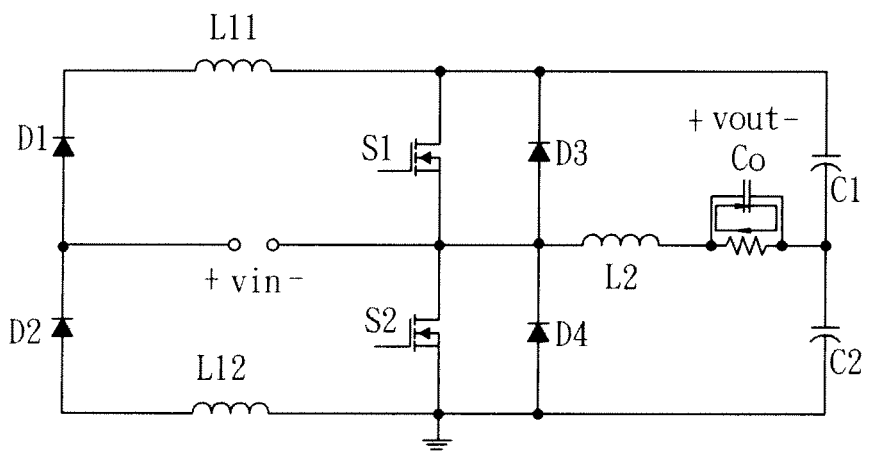
FIG. 22 is a schematic equivalent electrical circuit diagram of the second preferred embodiment when operated in an eighth mode.

FIGS. 14a and 14b illustrate waveforms of the first and second control signals (Vgs1, Vgs2). FIGS. 14c, 14d and 14e illustrate waveforms of currents (iL11, iL22, iL2) flowing through the first boost inductor (L11), the second boost inductor (L12) and the buck inductor (L2), respectively. FIGS. 14f and 14g illustrate waveforms of a voltage (VL2) across the buck inductor (L2) and the AC voltage output (vout), respectively. Referring further to FIGS. 15 to 22, operation of the second preferred embodiment in each of first to eighth modes is similar to that of the first preferred embodiment, the details of which are thus omitted.

Figure 23:
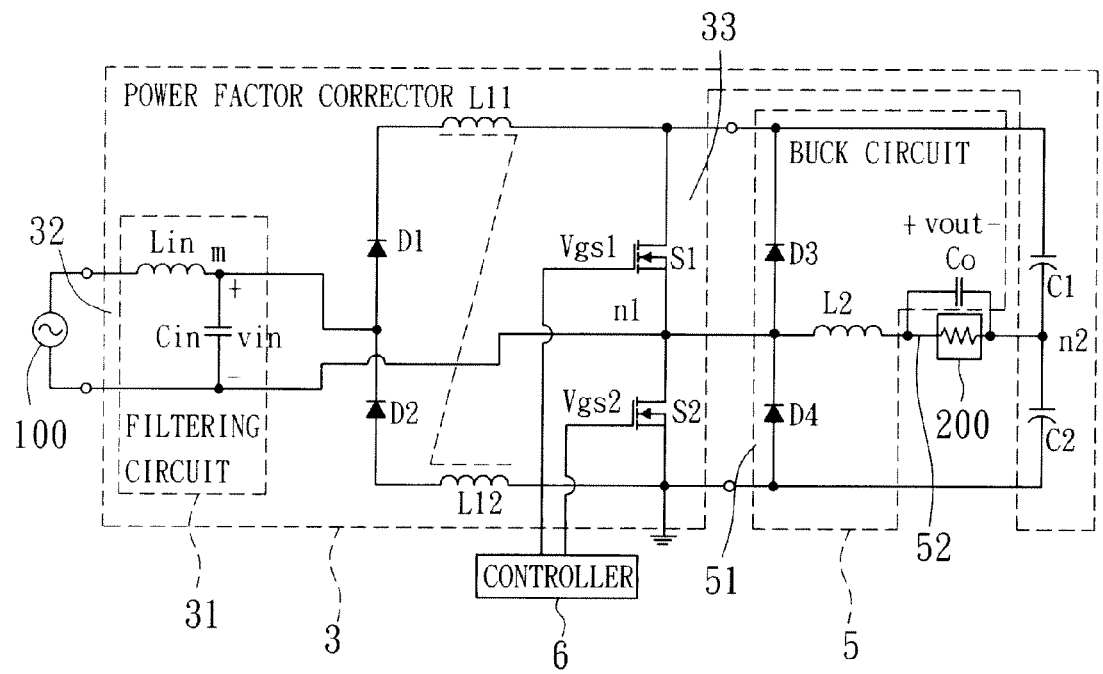
FIG. 23 is a schematic electrical circuit diagram illustrating a variation of the second preferred embodiment.

FIG. 23 illustrates a variation of the second preferred embodiment, wherein the first and second boost inductors (L11, L12) are integrated into a unitary coupling inductor.

Figure 24:
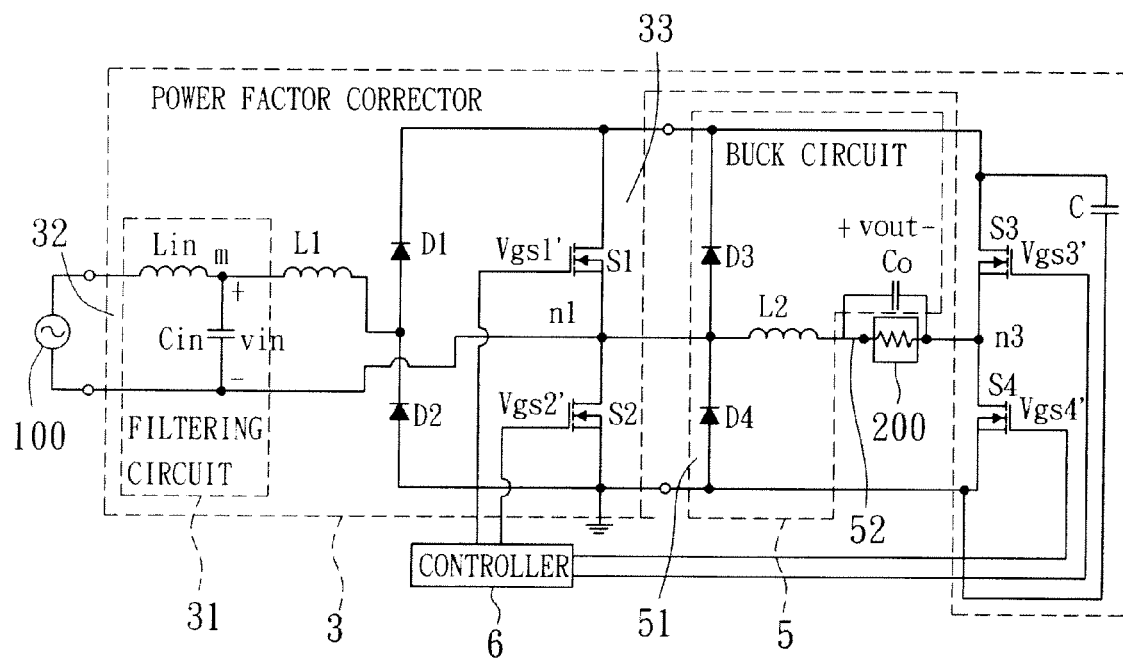
FIG. 24 is a schematic electrical circuit diagram illustrating the third preferred embodiment of an electronic ballast for an HID lamp according to the present invention.
Figures 25A, 25B, 25C, 25D:
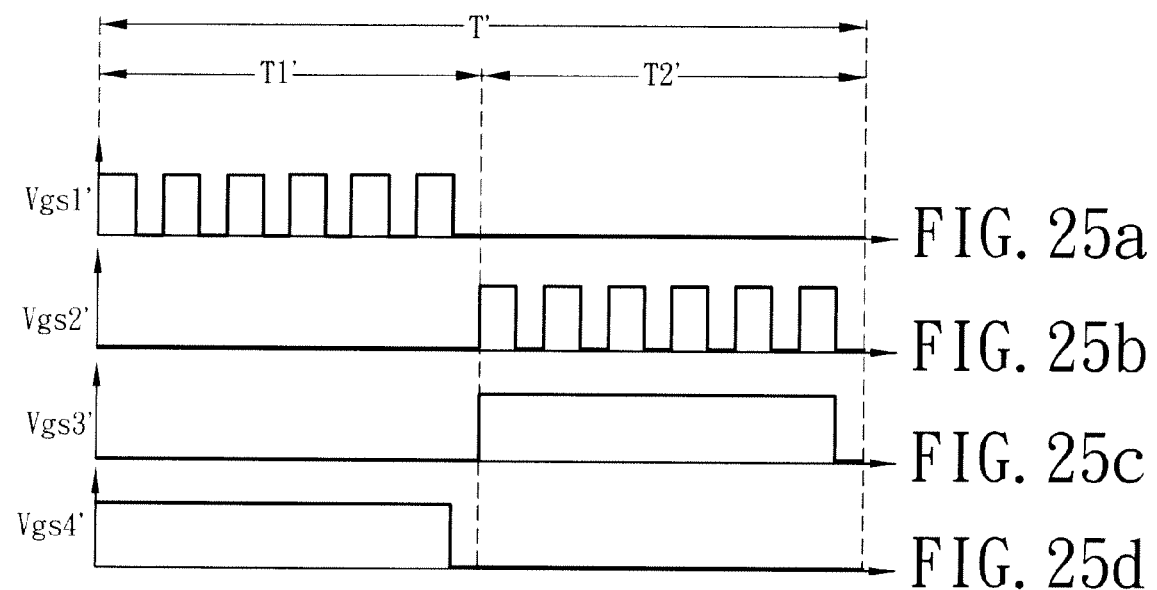
FIGS. 25a, 25b, 25c and 25d illustrate waveforms of first, second, third and fourth control signals (Vgs1, Vgs2, Vgs3, Vgs4) generated by a controller of the third preferred embodiment, respectively.

FIG. 24 illustrates the third preferred embodiment of an electronic ballast for an HID lamp 200 according to this invention, which is a modification of the first preferred embodiment.

Unlike the first preferred embodiment, the power factor corrector 3 further includes third and fourth power switches (S3, S4) that are coupled in series across the output side 33, and a capacitor (C) that is coupled across the output side 33 and that is substituted for the first and second capacitors (C1, C2) in the first preferred embodiment. The third power switch (S3) is connected to the first power switch (S1). The fourth power switch (S4) is connected to the second power switch (S2). A common node (n3) between the third and fourth power switches (S3, S4) is coupled to the output capacitor (Co). Each of the third and fourth power switches (S3, S4) has a control input end for receiving a corresponding one of third and fourth control signals (Vgs3, Vgs4) such that each of the third and fourth power switches (S3, S4) is operable based on the corresponding one of the third and fourth control signals (Vgs3, Vgs4) in one of an ON-state and an OFF-state. As such, the power factor corrector 3 is operable to output the boost DC voltage output in response to operation of the first, second, third and fourth power switches (S1, S2, S3, S4).

In this embodiment, the controller 6 is coupled to the control input ends of the first, second, third and fourth power switches (S1, S2, S3, S4). The controller 6 is configured to output a first control signal (Vgs1') to the control input end of the first power switch (S1) during a first period (T1'), to output a second control signal (Vgs2') to the control input end of the second power switch (S2) during a second period (T2'), to output a third control signal (Vgs3') to the control input end of the third power switch (S3), and to output a fourth control signal (Vgs4') to the control input end of the fourth power switch (S4). The first and second periods (T1', T2') constitute a control cycle of the controller 6. The AC voltage output (vout) and the third and fourth control signals (Vgs3', Vgs4') have the same cycle that is identical to the control cycle of the controller 6. The first and second control signals (Vgs1', Vgs2') are similar to each other such that the first and second power switches (S1, S2) have the same duty cycle, and are switched at the same frequency. In addition, duration of the ON-state of one of the third and fourth power switches (S3, S4) does not overlap duration of the ON-state of the other one of the third and fourth switches (S3, S4).

Thus, the first, second, third and fourth power switches (S1, S2, S3, S4) are controlled by the controller 6 such that operation of the electronic ballast of the third preferred embodiment is similar to that of the first preferred embodiment.

Figure 26:
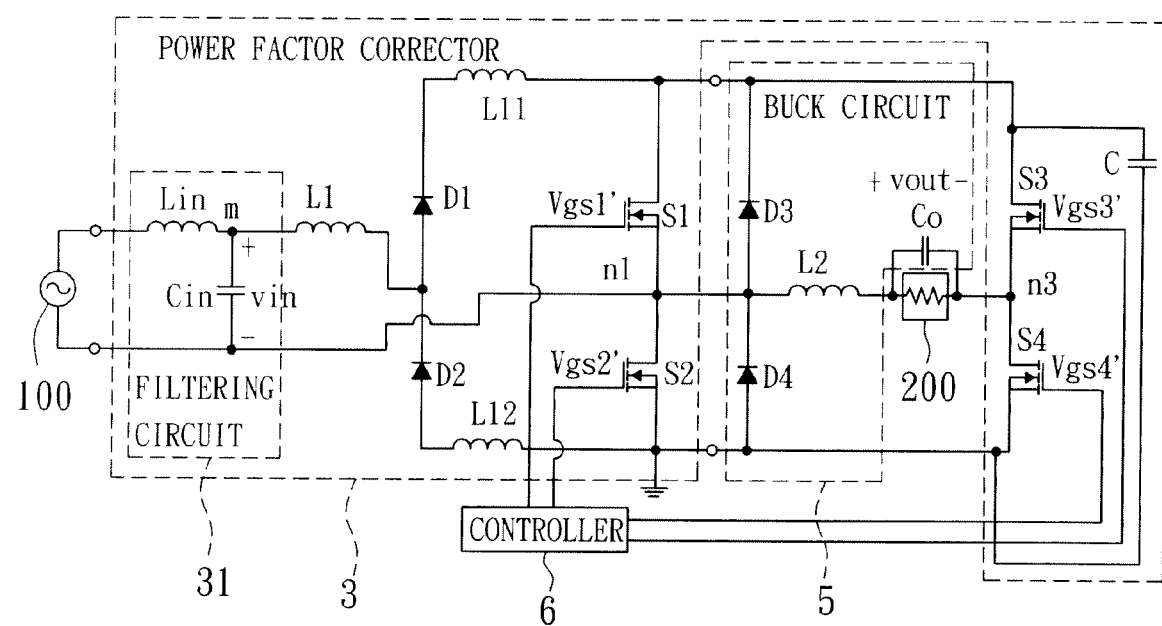
FIG. 26 is a schematic electrical circuit diagram illustrating the fourth preferred embodiment of an electronic ballast for an HID lamp according to the present invention.

FIG. 26 illustrates the fourth preferred embodiment of an electronic ballast for an HID lamp 200 according to this invention, which is a modification of the third preferred embodiment. Unlike the third preferred embodiment, the power factor corrector 3 includes first and second boost inductors (L11, L12) that are substituted for the boost inductor (L1) in the third preferred embodiment and that have the same construction as those in the second preferred embodiment shown in FIG. 13.

The following are some of the advantages attributed to the electronic ballast of the present invention:

1. The electronic ballast of the present invention has a relatively simple circuit construction that consists of a small number of components, thereby resulting in a relatively low cost.

2. The power factor corrector 3 converts the AC input voltage into the boosted DC voltage output. The buck circuit 5 converts the boosted DC voltage output into the AC voltage output (vout). Therefore, the multi-stage conversion encountered in the prior art can be avoided, thereby resulting in increased power conversion efficiency.

3. The power factor corrector 3 can provide an enhanced power factor.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electronic ballast for a high intensity discharge (HID) lamp comprising:
   a power factor corrector having an input side adapted to be coupled across a voltage source for receiving an AC input voltage from the voltage source, and an output side, said power factor corrector including first and second power switches connected in series across said output side, each of said first and second power switches having a control input end for receiving a corresponding one of first and second control signals, and operable based on the corresponding one of the first and second control signals in one of an ON-state and an OFF-state, said power factor corrector being operable to output at said output side a boosted DC voltage output corresponding to the AC input voltage in response to operation of said first and second power switches; and
   a buck circuit having an input side coupled to said output side of said power factor corrector for receiving the boosted DC voltage output, and an output side adapted to be coupled across the HID lamp, said buck circuit being operable based on the boosted DC voltage output to output an AC voltage output in the form of an AC square wave signal to the HID lamp.

2. The electronic ballast as claimed in claim 1, wherein said power factor corrector further includes a filtering circuit for filtering the AC input voltage from the voltage source to eliminate high-frequency electromagnetic interference.

3. The electronic ballast as claimed in claim 2, wherein said filtering circuit includes a filtering inductor and a filtering capacitor connected electrically in series across said input side of said power factor corrector, said filtering capacitor being coupled to a common node between said first and second power switches.

4. The electronic ballast as claimed in claim 3, wherein said power factor corrector further includes first and second capacitors coupled in series across said output side thereof.

5. The electronic ballast as claimed in claim 4, further comprising a controller coupled to said control input ends of said first and second power switches, and configured to output the first control signal to said control input end of said first power switch during a first period, and to output a second control signal to said control input end of said second power switch during a second period, the first and second power switches having the same duty cycle, said first and second periods constituting a control cycle of said controller that is identical to a cycle of the AC voltage output.

6. The electronic ballast as claimed in claim 4, wherein said buck circuit includes:
   third and fourth diodes connected in series across said input side of said buck circuit, said third diode being coupled in parallel to said first power switch, said fourth diode being coupled in parallel to said second power switch, said third diode having an anode coupled to a cathode of said fourth diode, and to said common node between said first and second power switches of said power factor corrector; and a buck inductor and an output capacitor coupled in series between said common node between said first and second power switches, and a common node between said first and second capacitors, said output capacitor being coupled across said output side of said buck circuit, said buck inductor being coupled to said common node between said first and second power switches of said power factor corrector, said output capacitor being coupled to said common node between said first and second capacitors of said power factor corrector.

7. The electronic ballast as claimed in claim 6, wherein said power factor corrector further includes:

a boost inductor coupled to a common node between said filtering inductor and said filtering capacitor;

a first rectifying diode having an anode coupled to said boost inductor, and a cathode coupled to said first power switch; and a second rectifying diode having an anode coupled to said second power switch, and a cathode coupled to said boost inductor and said anode of said first rectifying diode.

8. The electronic ballast as claimed in claim 6, wherein said power factor corrector further includes:

a first rectifying diode having an anode coupled to a common node between said filtering inductor and said filtering capacitor, and a cathode;

a second rectifying diode having an anode, and a cathode coupled to said anode of said first rectifying diode;

a first boost inductor coupled between said cathode of said first rectifying diode and said first power switch; and a second boost inductor coupled between said anode of said second rectifying diode and said second power switch.

9. The electronic ballast as claimed in claim 3, wherein:

said power factor corrector further includes third and fourth power switches coupled in series across said output side, said third power switch being connected to said first power switch, said fourth power switch being connected to said second power switch, each of said third and fourth power switches having a control input end for receiving a corresponding one of third and fourth control signals, and operable based on the corresponding one of the third and fourth control signals in one of an ON-state and an OFF-state; and said power factor corrector is operable to output the boost DC voltage output in response to operation of said first, second, third and fourth power switches.

10. The electronic ballast as claimed in claim 9, further comprising a controller coupled to said control input ends of said first, second, third and fourth power switches, and configured to output the first control signal to said control input end of said first power switch during a first period, to output the second control signal to said control input end of said second power switch, to output the third control signal to said control input end of said third power switch, and to output the fourth control signal to control input end of said fourth power switch during a second period;

wherein the first and second periods constitute a control cycle of said controller, the AC voltage output and the second and third control signals having the same cycle that is identical to the control cycle of said controller;

wherein said first and fourth power switches have the same duty cycle, and are switched at the same frequency; and wherein duration of the ON-state of one of said second and third power switches does not overlap duration of the ON-state of the other one of said second and third switches.

11. The electronic ballast as claimed in claim 9, wherein said buck circuit includes:

third and fourth diodes connected in series across said input side of said buck circuit, said third diode being coupled in parallel to said first power switch, said fourth diode being coupled in parallel to said second power switch, said third diode having an anode coupled to a cathode of said fourth diode, and to said common node between said first and second power switches of said power factor corrector; and a buck inductor and an output capacitor coupled in series between said common node between said first and second power switches, and a common node between said third and fourth power switches, said output capacitor being coupled across said output side of said buck circuit, said buck inductor being coupled to said common node between said first and second power switches of said power factor corrector, said output capacitor being coupled to said common node between said third and fourth power switches of said power factor corrector.

12. The electronic ballast as claimed in claim 11, wherein said power factor corrector further includes:

a boost inductor coupled to a common node between said filtering inductor and said filtering capacitor;

a first rectifying diode having an anode coupled to said boost inductor, and a cathode coupled to said first power switch; and a second rectifying diode having an anode coupled to said second power switch, and a cathode coupled to said boost inductor and said anode of said first rectifying diode.

13. The electronic ballast as claimed in claim 11, wherein said power factor corrector further includes:

a first rectifying diode having an anode coupled to a common node of said filtering inductor and said filtering capacitor, and a cathode;

a second rectifying diode having an anode, and a cathode coupled to said anode of said first rectifying diode;

a first boost inductor coupled between said cathode of said first rectifying diode and said first power switch; and a second boost inductor coupled between said anode of said second rectifying diode and said second power switch.

* * * * *